United States Patent
Rabinovitch et al.

(10) Patent No.: US 6,855,402 B2
(45) Date of Patent: Feb. 15, 2005

(54) WEATHER RESISTANT PLASTIC COMPOSITES CAPPED WITH POLYETHYLENE TEREPHTHALATE GLYCOL (PETG) FOR OUTDOOR EXPOSURES

(75) Inventors: Elvira B. Rabinovitch, Solon, OH (US); James W. Summers, Bay Village, OH (US)

(73) Assignee: Polyone Corporation, Avon Lake, OH (US)

( * ) Notice: Subject to any disclaimer, the term of this patent is extended or adjusted under 35 U.S.C. 154(b) by 0 days.

(21) Appl. No.: 10/140,606

(22) Filed: May 7, 2002

(65) Prior Publication Data

US 2003/0211347 A1 Nov. 13, 2003

(51) Int. Cl.[7] .................. B32B 27/08; B32B 27/28; B32B 27/30; B32B 27/32; B32B 27/36
(52) U.S. Cl. .................. 428/212; 428/213; 428/215; 428/216; 428/412; 428/483; 428/480; 428/521
(58) Field of Search .................. 428/480, 483, 428/213, 522, 212

(56) References Cited

U.S. PATENT DOCUMENTS

| | | | |
|---|---|---|---|
| 3,476,627 A | | 11/1969 | Squires |
| 4,100,325 A | | 7/1978 | Summers et al. |
| 4,166,881 A | * | 9/1979 | Congdon et al. ............ 428/463 |
| 4,208,468 A | * | 6/1980 | Cunningham et al. ... 428/317.1 |
| 4,225,688 A | * | 9/1980 | Dennehey et al. .......... 525/444 |
| 4,505,400 A | | 3/1985 | Bennett |
| 4,883,696 A | * | 11/1989 | Iwanami et al. ............ 428/35.4 |
| 5,098,202 A | * | 3/1992 | Rosenbaum .................. 383/67 |
| 5,643,666 A | * | 7/1997 | Eckart et al. ................ 428/339 |
| 5,688,738 A | * | 11/1997 | Lu .............................. 503/227 |
| 5,894,048 A | * | 4/1999 | Eckart et al. ................ 428/339 |
| 6,025,069 A | * | 2/2000 | Eckart et al. ................ 428/339 |
| 6,068,900 A | | 5/2000 | Kohn et al. |
| 6,110,864 A | * | 8/2000 | Lu .............................. 503/227 |
| 6,183,842 B1 | * | 2/2001 | Shimizu et al. ............. 428/141 |

FOREIGN PATENT DOCUMENTS

| WO | WO 97/22474 | * | 6/1997 |
|---|---|---|---|

OTHER PUBLICATIONS

Schimtz, Peter et al., "Films." Ullmann's Encyclopedia of Industrial Chemistry, 5th Ed., vol. A11 (1988), pp. 85–95, 108–110.*

Webpage printout from Dictionary.com for "rigid" (definition dates 1996, 1997, 1998, 2000).*

* cited by examiner

*Primary Examiner*—Vivian Chen
(74) *Attorney, Agent, or Firm*—Hudak, Shunk & Farine Co. L.P.A.; John H. Hornickel

(57) ABSTRACT

A composite layered plastic article particularly resistant to outdoor exposure to heat, sunlight and UV degradation comprises a top surface exposed layer of PETG fused to a rigid substrate layer selected from PVC, or CPVC, or HIPS, or ABS, or ASA, or PC. The PETG layer is preferably co-extruded with the substrate layer and heat fused together to produce a laminated layered composite article. The composite layered plastic is particularly useful for color retention of dark colors and bright masstone colors, as well as pastel and white colors

14 Claims, No Drawings

WEATHER RESISTANT PLASTIC COMPOSITES CAPPED WITH POLYETHYLENE TEREPHTHALATE GLYCOL (PETG) FOR OUTDOOR EXPOSURES

This invention pertains to weather resistant layered plastic composites comprising a top surface layer of glycol modified polyethylene terephthalate (PETG) as capping surface material for plastic substrates. The PETG surface layer provides considerably improved resistance to outdoor exposure, particularly resistance to sunlight, UV radiation, and heat, and further enables outdoor use of plastic as substrates in exterior exposures. Particularly useful polymeric structural substrates capped with PETG include polyvinyl chloride (PVC), chlorinated polyvinyl chloride (CPVC), high impact polystyrene (HIPS), polyacrylonitrile-butadiene-styrene (ABS), polyacrylate-styrene-acrlonitrile (ASA), and polycarbonate (PC).

BACKGROUND OF THE INVENTION

Rigid polymeric materials contain little or no plasticizer and commonly are used in a wide variety of uses sheltered from direct exposure to outside sunlight, heat and UV radiation. External exposure to heat and sunlight is known to degrade various polymeric materials and invariably break down the polymeric chemical structure and otherwise deteriorate the polymeric materials and physical appearance of plastic parts. Polymeric structural plastic substrates are engineered rigid plastics having good mechanical strength and dimensional stability suitably designed for external housing and other outdoor uses. Polymeric substrates frequently contain little or no plasticizer and typically have a good balance of physical properties such as high tensile, stiffness, high compressive and shear strength, and high impact properties. However, if outdoor products made from these polymeric substrates are to have any practical commercial value in outdoor exposures, such as house siding, window and door frames and profiles, exterior sash applications, shutters, roof vents, outdoor fences and decking, and similar external structures, the polymeric materials must have resistance to outdoor exposure environments, especially sunlight and heat.

Weathering deterioration of such polymeric materials is often initiated by damaging radiation from exposure to the sun or by hydrolysis of esters, carbonates, or amides in the polymeric structures. For instance, Arizona exposure is sunny and dry which emphasizes UV exposure, while Ohio exposure is less sunny, wetter and subject to more acid rain, which emphasizes hydrolysis deterioration. Sun energy penetrating the atmosphere has been measured as a function of wavelength. Vacuum ultraviolet and ultraviolet rays shorter than 2800 angstrom units are absorbed by the atmosphere and consequently the earth is shielded from severe ultraviolet damage from these wavelengths. However, some of the ultraviolet energy, most visible energy, and much infrared energy penetrates the atmosphere and can cause considerable damage upon exposure. For instance, vacuum ultraviolet causes chemical damage and can be of particular concern to polymeric applications in space where little atmosphere is available for protection. The infrared region of sunlight energizes molecular vibration including stretching, bending, rotating and heating of materials without much chemical damage. However, ultraviolet energies absorbed by polymeric materials are capable of breaking chemical bonds leading to oxidation and polymer chain scission, which often causes discoloration and imbrittlement of plastic materials. Breakage of polymeric bonds resulting in reduction of molecular weight causes brittleness. Therefore, loss of impact strength is often indicative of the degradation which has occurred. Some polymers containing ester, amide, or carbonate groups lose molecular weight by hydrolysis and become brittle in moist atmospheres, particularly in atmospheres high in acid rain.

In the past, some rigid PVC products used for exterior applications consisted of a structural substrate of rigid PVC and a top thinner surface layer of plasticized PVC called a cap or capstock. The layered composites are comprised of a thin layer of semi-rigid PVC co-extruded or laminated over a PVC substrate to achieve good weatherability and color retention and protect the rigid structural substrate understructure. Semi-rigid and flexible PVCs contain high levels of plasticizer which tend to resist heat and sun degradation. However, the difference in glass transition in conjunction with stiffness and expansion differences of the semi-rigid PVC cap relative to the rigid PVC substrate causes a differential expansion and contraction, and, therefore, warping and distortion in the heating and cooling steps, especially in extrusion processes, where extrudates of semi-rigid PVC cap over rigid PVC substrate exhibit dimensional distortion, especially during cooling. In addition, semi-rigid capping layers provide limited color choices, mostly limited to opaque colors only, and are not useful for bright masstone colors. For instance, U.S. Pat. No. 4,100,325 teaches PVC surface capstock containing high levels of plasticizer to provide useful layered composites exhibiting considerably improved appearance retention and degradation resistance while maintaining structural integrity and impact resistance. Although effective to reduce degradation, co-extrusion of plasticized PVCs capstock in conjunction with rigid PVC substrates in wide panels sometimes can result in distortion and warping during the co-extrusion process due to differences in Tg, stiffness, thermal expansion and contraction of the two layers from the wide heat differentials encountered in heating and cooling steps of the co-extrusion process.

In the unrelated art of flexible packaging, glycol modified polyethylene terephthalate known as PETG is suggested in U.S. Pat. No. 4,505,400 as a sealing film layer combined with a polyester film layer subjected to molecular orientated structuring to provide flexible films useful in flexible film packaging. Similarly, U.S. Pat. No. 6,068,900 discloses a plastic container having an outer layer of PETG and an inner layer of polyethylene terephthalate and/or polyethylene naphthalate.

SUMMARY OF THE INVENTION

It now has been found that PETG based thermoplastics provide an excellent weather resistant capstock material for providing a protective top surface layer for rigid polymeric substrates such as PVC, CPVC, HIPS, ABS, ASA and PC. The PETG extrusions or moldings provide excellent weather resistance, especially resistant to excessive heat, sunlight and UV radiation, and further avoids HCl acid formation characteristic of such environmental exposures to PVCs. The PETG exposed surface layer extrudate approximates the thermal expansion and contraction characteristics of these rigid polymeric substrates and effectively avoids dimensional distortion between two widely different Tg plastic materials. PETG can be compounded with additives to become weather resistant comparable to or better than semi-rigid PVC or other semi-rigid plastics such as acrylic-styrene-acrylonitrile (ASA), particularly for bright masstone colors. PETG used as a capping surface layer over rigid polymeric substrates in accordance with this invention is capable of resisting heat, sunlight and UV radiation comparable to expensive fluorocarbon polymers, such as polyvinylidene fluoride (PVDF), and thus provides comparable weathering resistance at much lower cost. The thermal properties of PETG, such as glass transition, coefficient of thermal expansion, and heat deflection temperature are all comparable to similar physical properties of the aforesaid rigid polymeric substrates. Thus, dimensional distortion of the PETG composites with such substrates is avoided. The processing temperature required for PETG is close to the processing temperatures used for these polymeric substrates thus enabling co-extrusion of a PETG top layer over these rigid polymeric substrates. These and other advantages of this invention will become more apparent by referring to the detailed description of the invention along with the illustrative examples hereinafter.

Briefly, the invention pertains to plastic articles of composite layers or laminates comprising a topcap exposed layer of PETG fused to a substrate layer of PVC, CPVC, HIPS, ABS, ASA, or PC, to provide a plastic article having a top layer protective of the substrate and particularly resistant to outdoor exposure and weatherability, especially heat, sunlight and direct UV exposure. Preferably, the fusion of the PETG top cap layer and the rigid polymeric substrate is by co-extrusion of the respective layers to form a fused layered composite or laminate. The topcap and substrate layers can be co-extruded separately and laminated hot or with an adhesive to the rigid polymeric substrate. The heating and cooling of PETG and the polymeric substrate layered composites minimizes the differential between thermal expansion and contraction due to hot forming and subsequent cooling thereby avoiding resultant warping due to such differential. On a layered thickness basis, the top cap layer can be from about 1 mil to about 30 mils or more, and preferably from about 3 mils to about 10 mils, while the polymeric substrate can be from about 25 mils to about 250 mils and preferably from about 30 mils to about 125 mils. Ordinarily the mil thickness of the PETG top surface layer is somewhat less than half the thickness of the composite laminate to maintain overall rigidity of the laminate.

DETAILED DESCRIPTION OF THE INVENTION

The invention comprises a layered composite plastic article of a PETG top cap protective layer fused or otherwise adhered to a bottom substrate layer of PVC, CPVC, HIPS, ABS, ASA, or PC.

Referring first to the PETG topcap layer resistant to outdoor heat and sunlight, the PETG topcap layer comprises glycol modified PET, that is, cyclohexane glycol, propylene glycol, diethylene glycol, or other glycol modified polyethylene terephthalate. PET is a polycondensation polymerized polymer of ethylene glycol and terephthalic acid, or transesterified with dimethyl terephthalate, to produce PET. Ordinarily ethylene glycol is esterified or transesterified using a continuous melt phase condensation polymerization process, or transesterification process, and can be followed by solid state polymerization at higher temperatures to obtain higher molecular weight PET, if desired. PETG is a cyclohexane glycol or other glycol modified polyethylene terephthalate copolyester produced by polymerizing minor amounts of cyclohexane glycol or other glycol along with ethylene glycol. Other glycols include propylene glycol, diethylene glycol or any other linear low molecular weight other than ethylene glycol. PETG ordinarily is an amorphous polyester of terephthalic acid esterified with a mixture of predominately ethylene glycol and lesser amounts of 1,4-cyclohexanedimethanol. PETG is commercially available from Eastman Chemical Company under the brand "KODAR" or more recently under the brand name "ESTAR". A particularly useful commercially available PETG is Estar 6763 available from Eastman Chemical. The amount of the component derived from 1,4-cyclohexanedimethanol or other glycol is from about 0.5 to about 20 parts by weight and preferably from about 1 to about 5 parts by weight based on a total 100 weight parts of PETG.

PETG can be compounded with other ingredients such as opacifying pigments, colorants, mineral fillers, stabilizers, lubricants, UV absorbers, processing aids, and other additives as desired. Useful UV absorbers are 2-(2'-hydroxyphenyl)benzotriazoles and 2-hydroxybenzophenones utilized at levels from about 0.1% to about 5% and preferably from about 0.2% to about 1% based on the weight of PETG resin. Useful opacifying pigments include titanium dioxide, zinc oxide, and titanate yellow, while useful tinting pigments include carbon black, yellow oxides, brown oxides, raw and burnt sienna or umber, chromium oxide green, cadmium pigments, chromium pigments, and other mixed metal oxide and organic pigments. PETG cap surface layers in accordance with this invention are particularly suitable for dark or bright masstone colors. Masstone colors ordinarily do not contain appreciable amounts of opacifying pigment, if any, and typically contain less than about 5 and desirably less than about 3.0 weight parts per 100 weight parts of PETG resin. Dark brown colors are particularly popular exterior colors.

Useful fillers include clay, silica, talc, mica, wallostonite, barium sulfate, and calcium carbonate. If desired, useful antioxidants can be used and include phenolic antioxidants, while useful photostabilizers include organic phosphates, and organotin thiolates (mercaptides). Useful lubricants include metal stearates, paraffin oils and waxes. Useful UV absorbers include benzophenones and benzotriazoles. Useful thicknesses of the PETG layer can be from about 1 mil to about 30 mils and preferably from about 2 to about 10 mils, provided the overall composite structure is maintained rigid. Ordinarily the PETG layer is less than one-half of the composite overall thickness.

Polymeric structural plastics useful as substrate material for capping with PETG in accordance with this invention comprise primarily rigid plastics containing little or no plasticizer and having a good balance of mechanical strength and dimensional stability useful for external housing parts and other outdoor uses exposed to sunlight, heat, moisture and other weather conditions. Particularly useful polymeric structural substrates capped with PETG include polyvinyl chloride (PVC), chlorinated polyvinyl chloride (CPVC), high impact polystyrene (HIPS), polyacrylonitrile-butadiene-styrene (ABS), polyacrylate-styrene-acrlonitrile (ASA), and polycarbonate (PC).

PVC or CPVC are essentially homopolymers of vinyl chloride with minor amounts of other co-monomers, if any. CPVC is chlorinated PVC where PVC containing approximately 57% chlorine is further reacted with chlorine radicals produced from chlorine gas dispersed in water and irradiated to generate chlorine radicals dissolved in water to produce CPVC, a polymer with a higher Tg and heat distorsion temperature. Commercial CPVC typically contains by weight from about 58% to about 70% and preferably from about 63% to about 68% chlorine. PVC can be chlorinated by the method shown in U.S. Pat. No. 2,996,489, which is incorporated herein by reference.

Poly (vinyl chloride) comprises polymerized vinyl chloride monomer where preferred polymers are essentially homopolymerized vinyl chloride with little or no copolymerized co-monomers. Useful co-monomers if desired include mono-unsaturated ethylenically unsaturated monomer copolymerizable with vinyl chloride monomer by addition polymerization. Useful co-monomers include other vinyl monomers such as vinyl acetate, ethers, and vinylidene chloride. Other useful co-monomers comprise mono-ethylenically unsaturated monomers including acrylics such as lower alkyl acrylates or methacrylates, acrylic and methacrylic acid, lower alkenyl olefins, vinyl aromatics such as styrene and styrene derivatives, and vinyl esters and ethers. Typical useful commercial co-monomers include acrylonitrile, 2-ethylhexyl acrylate, vinylidene chloride, and isobutyl ether. Useful PVC copolymers can contain from about 0.1% to about 10% or 15%, preferably from about 0.5% to about 5%, by weight of copolymerized co-monomer. Chlorinated PVC copolymers can be obtained by chlorinating such PVC copolymers.

Preferred PVCs are suspension polymerized vinyl chloride although less preferred mass (bulk) polymerized can be useful. Rigid PVCs contain little or no plasticizer, and preferably less than about 10 or about 5 weight parts of copolymerized co-monomer based 100 weight parts of vinyl chloride, and most preferably are essentially homopolymers of vinyl chloride. Useful weight average molecular weights of PVCs can be from about 39,000 to about 150,000, and preferably from about 55,000 to about 109,000, where the molecular weight is measured by size exclusion chromatography and correlated to absolute PVC molecular weights determined by Perkins et al., *Journal of Vinyl Technology*, Vol. 15, No. 2 (1993). The PVCs of this invention have an inherent viscosity from about 0.45 to about 1.5 and preferably from about 0.68 to about 1.2, as measured by using 0.2 grams of resin in 100 ml of cyclohexanone at 30 degrees C. by ASTM D 1243.

In compounding rigid PVCs, other compounding ingredients are desirably incorporated into the PVC or CPVC resins to produce compounding formulas. In addition to heat stabilizers, other compounding ingredients can include fillers, pigments and colorants if desired, processing lubricants, impact modifiers, other processing aids, as well as other additives such as biocides or flame retardants. Fillers ordinarily are used to reduce cost and gloss and can include conventional calcium carbonates, clay, talc, mica, and diatomaceous earth fillers. Useful pigments and colorants can be organic, but preferably mineral such as titanium dioxide, although opacifying pigments, tinting pigments and colorants are not used to much extent in substrate PVCs. Lubricants can be used to reduce sticking to hot processing metal surfaces and can include polyethylene, paraffin oils, and paraffin waxes in combination with metal stearates. Other lubricants include stearic acid, amide waxes, ester waxes, metal carboxylates, and carboxylic acids. Impact modifiers are useful in rigid PVCs to increase toughness and can include chlorinated polyethylenes, ABS, acrylic polymers and copolymers, or metharylic copolymers such as methylmethacrylate-butadiene-styrene (MBS). Other processing aids for extruding rigid PVCs in complex profiles include acrylic or styrene-acrylonitrile copolymers to prevent edge tear in the extrusion of complex profiles or configurations.

High impact polystyrene (HIPS) is polystyrene reinforced with a rubber compound and comprises a toughened general purpose non-crystalline polystyrene thermoplastic toughened by adding rubber additive without diminishing other properties. The rubber additive component, called a gel, comprises a large number of gel particles with a modulus much lower than the matrix polystyrene. The gel particles are added to avoid brittle fracture by absorbing impact energy through micro-craze formation at the gel particles. The rubber gel particles typically comprise polybutadiene and ordinarily are particle sizes of about 1 to about 2 microns, where smaller particles provide a moderately improved modulus. Polystyrene is the matrix phase in which the rubber gel particles are dispersed. Polystyrene is susceptible to degradation by heat, oxidation, UV radiation, high energy radiation, and shear, and, among other problems, can cause rapid yellowing and embrittlement. HIPS is more vulnerable to degradation because of the susceptibility of the polybutadiene particles to oxidation, where the formation of free radicals can lead to degradation in the polystyrene phase. Accordingly, the HIPS plastic substrate weatherability can be substantially improved by PETG capping in accordance with this invention.

ABS is a polymeric material comprising copolymerization of acrylonitrile, butadiene, and styrene in various ratios to form a terpolymer comprising butadiene rubber grafted with styrene-acrylonitrile copolymer to provide thermoplastics exhibiting various physical and strength properties, as desired. Acrylonitrile contributes heat stability, chemical resistance, and aging resistance, while butadiene provides low temperature property retention, toughness, and impact strength, and styrene adds luster, rigidity, and processing ease. Ordinarily ABS comprises from about 5% to about 30% by weight butadiene rubber with the balance being styrene-acrylonitrile copolymer. A fourth monomer can be copolymerized if desired to provide specially improved properties, such as alpha-methyl styrene for higher heat deflection, and methyl methacrylate for transparency. ABS has poor resistance to UV light, where direct sunlight will cause dramatic changes in appearance and physical properties. Accordingly, ABS plastic substrate weatherability can be substantially improved by PETG capping in accordance with this invention.

ASA polymers comprise acrylate-styrene-acrylonitrile polymers, sometimes called acrylonitrile-acrylic elastomer-styrene terpolymer (AAS), is produced by grafting an acrylic ester elastomer to styrene-acrylonitrile during the copolymerization reaction between styrene and acrylonitrile. The acrylic ester elastomer is in the form of very finely divided particles uniformly distributed in and bonded to the styrene-acrylonitrile backbone. Acrylic resists sunlight and oxygen and provides weather resistance along with impact strength. Styrene-acrylonitrile provides rigidity, moldability ease, and shape retaining characteristics. By varying the weight ratios of the respective monomers along with the molecular weight, the degree of grafting, and the morphology of the terpolymer, the physical properties of ASA polymer can be varied as desired for the specific end use intended. Other monomers such as alpha-methyl styrene or N-phenylmalemide can be partially or wholly substituted for styrene to obtain higher heat deflection temperatures, if desired. Although ASA polymers are considerably more resistant to sunlight and thermal aging than ABS polymers, ASA polymeric substrates can be improved by capping with PETG to considerably improve resistance to sunlight, UV radiation and heat in accordance with this invention.

Polycarbonate polymers (PC) are a class of polyester produced by the reaction product of carbonic acid derivatives with aromatic or aliphatic diols or mixtures thereof. Aliphatic polycarbonates are not often used as thermoplastics, but have been used as a reactant modifier or plasticizer for other polymeric materials including aromatic polycarbonates. The most common aromatic polycarbonate is poly(bisphenol-A carbonate) which typically comprises the condensation reaction product of bisphenol-A with carbonyl chloride (phosgene) in the presence of monophenol chain terminator to control molecular weight ordinarily from about 20,000 to about 35,000 or more. Polycarbonates can be blended with other polymers such as for instance ABS or polyesters. Polycarbonates tend to be hygroscopic and thus susceptible to moisture degradation causing loss in physical properties, as well as subject to thermal degradation, UV degradation, and yellowing with prolonged exposures to such elements. Thus, weather resistance of polycarbonate polymers used as substrate materials can be considerably improved by PETG capping in accordance with this invention.

In preferred aspects of this invention, PETG capstock is fused or otherwise adhered to polymeric substrates preferably selected from PVC, CPVC, HIPS, ABS, ASA, and PC substrates by co-extrusion to form the composite layered article. Co-extrusion is a process where two or more polymeric layers, such as PETG and rigid PVC, are brought together simultaneously into contact at a point prior to extrusion through a shape forming co-extrusion die, such as shown in U.S. Pat. No. 3,476,627.

Less preferred is separate extrusion of a top surface PETG layer and a polymeric substrate layer, where the two layers are subsequently brought together under pressure between rolls or belts and heat to form a composite layered structure. Molding of separate layers with subsequent fusion or adherence together is likewise useful, but similarly less preferred. In both of these processes, though less preferred, the separate top and substrate layers can be extruded or molded, and then heat fused together by pressing the PETG cap surface layer and substrate together between two rolls while both layers are hot, or at least the substrate is still hot, to heat fuse the PETG surface layer to the substrate layer.

The mil thickness of the PETG cap surface layer ordinarily will need to be at least one mil thickness to provide sufficient resistance to outdoor heat, sunlight and UV radiation. The maximum thickness of the PETG cap surface layer depends on the thickness of the composite article produced, but necessary to maintain the overall rigid polymeric structure of the PVC, CPVC, HIPS, ABS, ASA, or PC substrates. Useful thickness of the PETG cap surface layer, as noted above, can be from about 1 mil to about 30 mils, and preferably from about 3 mils to about 10 mils, provided the thickness of the top surface PETG layer is less than about one-half, preferably less than about one-third, of the total thickness of the composite laminate to maintain the rigid overall structure of the laminated article imposed by the rigid substrate.

The layered composite laminated articles having a PETG surface layer in accordance with this invention comprise rigid plastic articles useful, for example, for sheets for roofing and wall panels, formed sheets for cladding, house siding, window and door frames and profiles, fencing, decking, linear exterior trims and similar exterior uses, and the like.

The important test for predicting resistance to sunlight, UV radiation and heat is 2 to 5 years of outdoor exposure in hot dry high UV climate, such as Arizona, hot humid high UV climate, such as Florida, and northern industrial climate such as Ohio. The exposure is conducted according to ASTM D1435. The samples are exposed unbacked at 45° angle facing south.

Color change Delta E is determined by color values of exposed and unexposed samples. Tristimulus X, Y and Z values are measured using 2° observer and illuminant C, specular components included in accordance with practice ASTM E805. The Hunter L, a, b units are calculated in accordance with the equations in test method ASTM D2244.

The merits of this invention are further illustrated and exemplified in the following illustrative examples.

EXAMPLE 1

PETG EASTAR 6763 clear pellets were mixed with pigments and in some cases UV absorber in a Henschell mixer at room temperature. PETG had an inherent viscosity of 0.7 and a Tg of 80° C. Then the mixture was extruded on the twin screw extruder at 410°–420° F. and pelletized. The colored pellets were then extruded on a single screw extruder and 2 inch×0.40 inch strip die. The extrusion was conducted at 420°–430° F. The strip samples were used for a weathering study (data shown in Table 1).

EXAMPLE 2

Rigid and semi-rigid PVC powder compounds were first prepared in a Henschell mixer and then milled on a 2 roll mill at the melt temperature 350° F. The sheets taken off the mill were then diced for further processing. The diced compounds were then extruded on a single screw extruder, 2 inch×0.040 inch strip die at the melt temperature 375° F. The strip samples were used for a weathering study (data shown in Table 1).

EXAMPLE 3

The composite of PETG over rigid PVC was prepared by co-extrusion process. Colored pellets of PETG capstock compound were prepared as in Eample 1, while rigid PVC substrate compound was prepared as in Example 2.

The composite was prepared by extruding rigid PVC substrate on a single screw extruder and PETG on a satellite single screw extruder, connected to the main extruder so that the PETG melt is introduced into the main extruder die forming the top cap layer over rigid PVC substrate. The co-extrusion conditions were as follows:

|  | Main Extruder | Satelite Extruder |
| --- | --- | --- |
| Extruder Size | 2½ Inch | 1¼ inch |
| Screw | Mixing Single Screw | Low Sheer Single Screw |
| Die | 3 in × 0.060 in. strip | — |
| Material | Rigid PVC | PETG |
| Zone Temp. (° F.) |  |  |
| 1 | 310 | 400 |
| 2 | 320 | 410 |
| 3 | 330 | 420 |
| 4 | 340 | 430–440 |
| 5 | 350 | — |
| Stock die temp. (° F.) | 378 (with PETG) | 420 |
| Screw RPM | 15 | 40 |
| Screw AMPS | 42 | 14 |
| Die pressure (psi) | 4600 | 6100 |

Composite thickness 55 mils.
Substrate thickness 45 mils.
Top PETG cap thickness 10 mils.

TABLE 1

COLOR CHANGE AFTER 3 YEARS OF OUTDOOR EXPOSURE FOR VARIOUS POLYMERIC MATERIALS. COLOR CHANGE IS DELTA E (HUNTER L, a, b.)

| Color | Exposure | PETG Kodar 6763 | Rigid PVC | Semirigid PVC Duracap 83974 | ASA ✓ Geloy 1226 | PVDF Kynar 500W** | PVDF/ PMMA 50/50 | PC Plexiglass HFI-7 |
|---|---|---|---|---|---|---|---|---|
| White | Arizona | 0.96 | 4.73 | 1.15 | 1.66 | — | — | — |
| | Ohio | 1.14 | 1.00 | 1.06 | 2.80 | — | — | — |
| | Florida | 1.75 | 2.63 | 1.36 | 5.27 | — | — | — |
| Clay | Arizona | 0.22 | 2.46 | 0.91 | 0.59 | — | — | — |
| | Ohio | 0.19 | 7.63 | 0.24 | 0.69 | — | — | — |
| | Florida | 0.67 | 1.88 | 0.58 | 0.74 | — | — | — |
| Blue | Arizona | 2.37 | 4.15 | 4.64 | 3.09 | — | — | — |
| | Ohio | 1.98 | 11.74 | 2.03 | 1.79 | — | — | — |
| | Florida | 2.90 | 5.28 | 1.20 | 6.08 | — | — | — |
| Bright Yellow | Arizona | 3.65/1.28* | — | 40.30 | — | — | — | — |
| | Ohio | 1.94/3.35* | — | 2.10 | — | — | — | — |
| | Florida | 2.50/5.16* | — | 11.96/0.52** | — | 3.10 | — | — |
| Bright Red | Arizona | 1.79/2.31* | — | 30.09 | — | 11.30 | — | — |
| | Ohio | 1.78/2.83* | — | 14.69 | — | — | — | — |
| | Florida | 1.21/2.09* | — | 17.01 | — | — | — | — |
| Dark Brown | Arizona | 0.65 | 3.79 | 2.14 | 1.09 | — | 0.17 | 2.76 |
| | Ohio | 1.24 | 3.98 | 1.43 | 0.89 | — | 0.53 | 2.53 |
| | Florida | 0.89 | 1.15 | 1.33 | 1.44 | — | 0.31 | 2.74 |

Note:
*Without/with 5 phr UV absorber
**2 year/3 year exposure
***Liquid coating

TABLE 2

PHYSICAL AND THERMAL PROPERTIES OF VARIOUS POLYMERS

| Property | ASTM Test Method | PETG EASTAR 6763 | Rigid PVC | Semi-rigid PVC Geon 83974 | CPVC | HIPS | ABS | ASA | PC |
|---|---|---|---|---|---|---|---|---|---|
| Tensile Modulus (MPa) | D638 | 1900 | 2375–3050 | 1255 | 2500–3050 | 900–3500 | 1600–2700 | 1650–2900 | 2070–2410 |
| Flexural Modulus (MPa) | D790 | 2100 | 2700–3050 | 1260 | 2500–3050 | 1000–3500 | 1800–2800 | 2500–2900 | 2150–2585 |
| Glass transition temperature (° C.) | DSC analysis | 80 | 78–83 | 12 | 90–110 | 85–110 | 88–120 | – | 145 |
| Coefficient of thermal expansion (cm/cm, ° C. × $10^5$) | D696 | 5.1 | 6.0–6.7 | 8.9 | 6.0–7.0 | 3.4–20 | 8.5–10 | 8.0–11 | 5.6–7.0 |
| Heat deflection temperature @1.82 Mpa load, (° C.) | D648 | 64 | 72–74 | 31 | 79–99 | 64–96 | 91–102 | 88–120 | 138–143 |

While in accordance with the Patent Statutes the best mode and preferred embodiment have been set forth, the scope of the invention is not limited thereto but rather by the scope of the attached claims.

What is claimed is:

1. A weather resistant plastic laminate, comprising:
   a cap surface plastic layer of glycol modified polyethylene terephthalate (PETG); and
   a rigid polymeric substrate plastic layer having the cap surface plastic layer fused or adhered to the substrate layer;
   wherein the rigid polymeric substrate plastic layer comprises polyvinyl chloride (PVC) or chlorinated polyvinyl chloride (CPVC) or high impact polystyrene (HIPS) or polyacrylonitrile-butadiene-styrene (ABS) or polyacrylate-styrene-acrylonitrile (ASA) or polycarbonate (PC);
   wherein the rigid polymeric substrate plastic layer has essentially no plasticizer;
   wherein the cap surface plastic layer contains opacifying pigment and contains UV absorber; and
   wherein the cap surface plastic layer protects the rigid polymeric substrate plastic layer during exterior usages from sunlight, UV radiation and heat; and
   wherein the cap surface plastic layer has thermal expansion and contraction characteristics approximate to thermal expansion and contraction characteristics of the rigid polymeric substrate plastic layer.

2. The weather resistant plastic laminate of claim 1, wherein the glycol is cyclohexane glycol, and wherein the rigid polymeric substrate plastic layer has a thickness of 30 mils to 125 mils.

3. The weather resistance plastic laminate of claim 2, where the glycol is 1,4-cyclohexanedimethanol, and wherein the rigid polymeric substrate plastic layer has no plasticizer.

4. The weather resistant plastic laminate of claim 1, wherein the substrate comprises PVC plastic, and wherein the CPVC plastic has essentially no plasticizer.

5. The weather resistant plastic laminate of claim 1, the substrate comprises CPVC plastic, and wherein the CPVC plastic has essentially no plasticizer.

6. The weather resistant plastic laminate of claim 1, wherein the substrate comprises HIPS plastic.

7. The weather resistant plastic laminate of claim 1, wherein the substrate comprises ABS plastic.

8. The weather resistant plastic laminate of claim 1, wherein the substrate comprises ASA plastic.

9. The weather resistant plastic laminate of claim 1, wherein the substrate comprises PC plastic.

10. The weather resistant plastic laminate of claim 1, wherein the cap surface plastic layer is less than about one-half the thickness of the laminate.

11. The weather resistant plastic laminate of claim 1, wherein the cap surface plastic layer protects the laminate from sunlight, UV radiation, and heat for a period of 2 to 5 years according to ASTM Test D1435.

12. The weather resistant plastic laminate of claim 1, in the form of a sheet adapted for uses selected from the group consisting of roofing, wall panels, cladding, house siding, and combinations thereof.

13. The weather resistant plastic laminate of claim 1, in the form of a profile adapted for uses selected from the group consisting of window frames, door frames, fencing, decking, exterior trim pieces, and combinations thereof.

14. The weather resistant plastic laminate of claim 1, wherein the cap surface plastic layer further comprises tinting pigments present in an amount of less than about 5 weight percent of the cap surface plastic layer.

* * * * *